Figure 1:
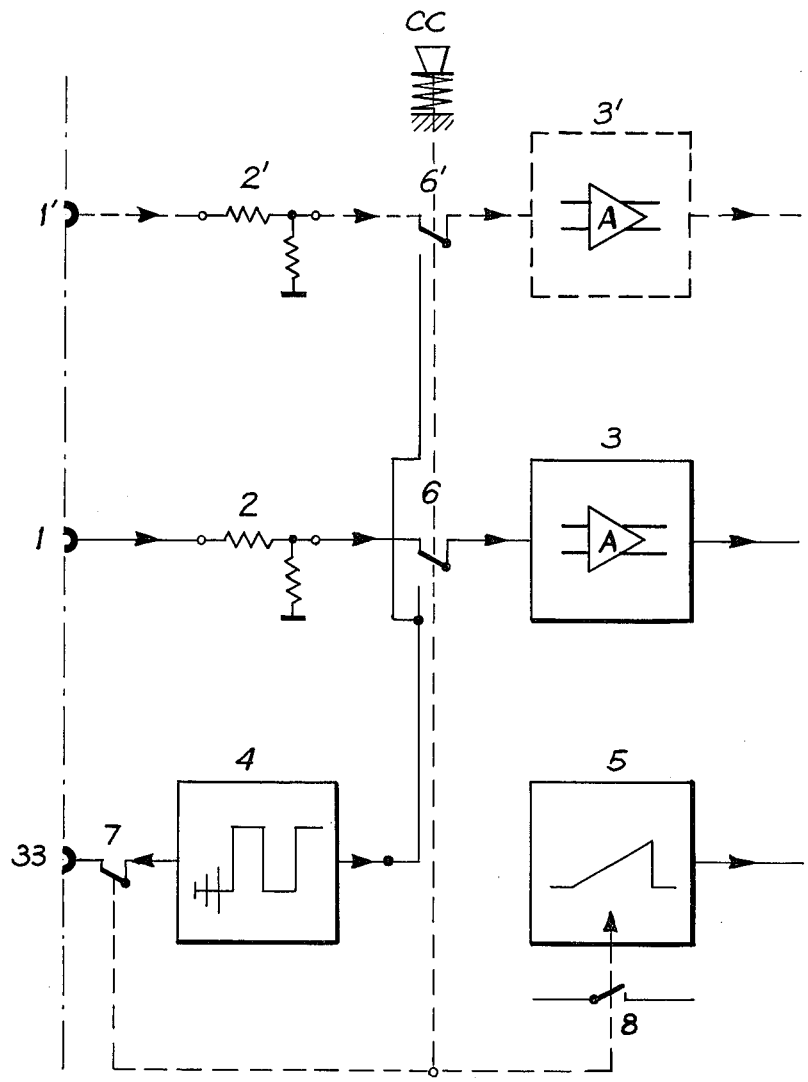

Nov. 2, 1965   H. WOLF   3,215,889
CATHODE RAY OSCILLOSCOPE CALIBRATION DEVICE
Filed March 19, 1962   2 Sheets-Sheet 1

INVENTOR
HELLMUTH WOLF
BY Toulmin & Toulmin
ATTORNEYS

United States Patent Office 3,215,889
Patented Nov. 2, 1965

3,215,889
CATHODE RAY OSCILLOSCOPE CALIBRATION DEVICE
Hellmuth Wolf, Reutlingen, Germany, assignor to Wandel u. Goltermann, Reutlingen, Wurttemberg, Germany
Filed Mar. 19, 1962, Ser. No. 180,578
Claims priority, application Germany, Mar. 28, 1961, W 29,718
10 Claims. (Cl. 315—25)

The present invention relates to a circuit arrangement in cathode-ray tube apparatus such as oscillographs and/or oscilloscopes featuring a self-contained calibration-voltage generator, permitting calibration of the sensitivity, of the sweep speed, and of the zero line position in one operation and permitting adjustment of associated units.

Cathode-ray oscilloscopes may be used to measure the exact amplitude and/or frequency as well as the direct current component of some quantity called the measurand. To obtain accurate results, it is necessary to calibrate the oscilloscope before or during the measuring procedure. This calibration is accomplished by checking the accuracy of the sweep speed constituting the time base, the exact amount of the amplitude or the deflection in Y direction, and the position of the zero line forming the basis for the measurement of the direct current component.

A conventional method of checking the amplitude is to disconnect the apparatus producing the measurand from the Y input terminal of the cathode ray oscilloscope (designated CRO in the following) and to connect this Y input terminal of the CRO to a signal generator, which is either built-in in the CRO or external thereof, supplying a calibration voltage of a defined amplitude. For this purpose it is necessary to adjust the Y gain and the sweep speed of the CRO in such a way that the calibration voltage appears as a waveform conveniently observed on the screen of the cathode ray tube in the CRO. Once this is done, accurate calibration may be performed with the aid of controls provided for the gain adjustment on the CRO front panel.

Upon completion of the calibration procedure, the conventional method requires that the calibration voltage applied to the Y input terminal of the CRO be removed, that the measurand be once more connected to that Y input terminal, and that the CRO controls be reset into the initial state.

A similar method is usually employed to calibrate the horizontal sweep speed of the CRO with the aid of a calibration voltage of defined frequency. The position of the zero line on the screen of the cathode ray is in the case of well known cathode ray oscilloscopes checked by connecting the CRO zero potential to its Y input terminal.

To complete the calibration procedure by conventional methods, many individual operations are necessary. These operations not only constitute a loss of time, especially where a series of high accuracy measurements calls for relatively frequent recalibration of the CRO, but also facilitate the introduction of errors due to operation of wrong control knobs and push-buttons or plugging to wrong jacks. The elimination of such errors is another source of a waste of time.

It is therefore an object of the present invention to eliminate these disadvantages by providing a circuit arrangement requiring operation of no more than one push-button control to complete the entire calibration procedure.

It is another object of the invention to provide the single push-button operation irrespective of the range to which the sweep generator and the trigger circuits were set prior to calibration.

Another object of the present invention is to provide the calibration circuit arrangement so that the calibration voltage may be utilized also for the adjustment of associated units employed in the measuring series.

Finally it is also an object of this invention to provide the calibration circuit in such a way as to permit simultaneous calibration of all channels of a multi-channel cathode-ray oscilloscope (CRO).

In accordance with one feature of the invention, operation of the said single control eliminates the need of further manipulation as, for instance, disconnection and reconnection of the measurand, or readjustment of the operating controls of the CRO; on the contrary, operation of the said single control causes the calibration voltage from the built-in-calibration-voltage generator to appear on the screen of the cathode ray tube, preferably in the wave form of a square wave, thus permitting to simultaneously observe the sensitivity, the sweep speed, and the position of the zero line by comparison with the defined amplitude, the defined frequency, and the defined potential of preferably the pulse bases, respectively, of the calibration voltage.

According to another feature of the invention, operation of the said single control causes the CRO trigger unit to became disconnected for the time the said control is operated so that the sweep generator may be triggered by the calibration voltage itself, thus ensuring a stable display regardless of the position of the associated switches on the CRO front panel controlling the trigger circuits.

Another feature of the invention is the utilization of the calibration voltage generator for adjusting purposes which is accomplished by the said generator having a second output connected to the CRO front panel from which the voltage for the adjustment procedure may be derived.

Figure 2:
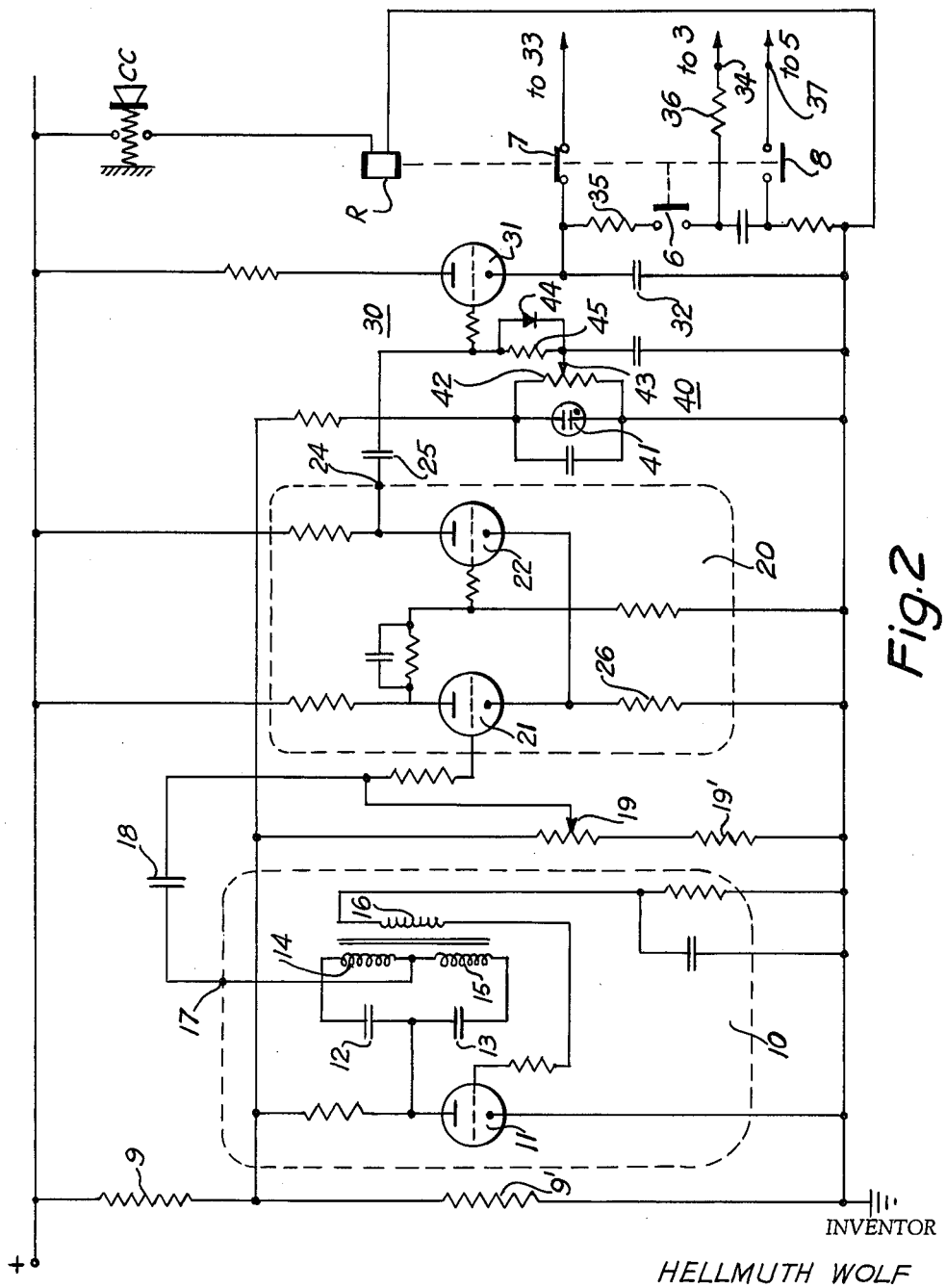

The utilization of the circuit arrangement in accordance with the present invention for calibration of multi-channel CRO and other features may become apparent in the following description of a preferred embodiment of the invention referring to the accompanying drawing in which FIG. 1 illustrates a block diagram of an embodiment of the invention including a calibration generator, and FIG. 2 illustrates a detailed circuit diagram of the calibration generator of FIG. 1.

In FIG. 1 of the drawings, the external Y input terminal 1 is arranged on the CRO front panel indicated by a dash-dotted line. This Y input terminal 1 of the CRO is connected to a Y amplifier 3 via a voltage divider 2 and a switch blade 6. The other blocks on the drawing represent the calibration voltage generator 4 and the horizontal sweep generator complete with trigger unit 5. The contacts 6, 7, 8 may be simultaneously operated by a push button switch CC either directly or via a relay constituting the single calibration control as internal enabling control for generator 4 to become effective for CRO calibration. The calibration voltage generator 4 is normally connected through contact 7 to its second output 33 provided on the CRO front panel, also as external terminal.

Proceeding now to the description of FIG. 2 there is disclosed a circuit diagram for the calibration voltage generator 4 of FIG. 1. There is first provided a sinusoidal wave oscillator 10 including a triode 11 resistively connected with its anode to a tap of a voltage divider 9, 9' which is connected to a suitable D.C. voltage source. The elements pertaining to the oscillator are encircled by a dashed line. The anode of triode 11 is connected to an L-C parallel, resonant circuit which comprises series connected capacitors 12, 13 and series connected coils 14, 15 connected in parallel to the capacitors. Coils 14 and 15 are inductively coupled to a transformer core having a secondary 16 which is connected between ground and the grid of triode 11 thus providing regenerative feed back for the resonant circuit. The junction of capacitors 12 and 13 is connected directly to the anode of triode 11, while the tap between coils 14 and 15 is the output terminal 17 of this feed back type oscillator. The capacitive coupling of the resonant circuit to the anode serves for suppressing excessive damping due to the inner resistance of triode 11, also, D.C.-biasing by pre-magnetization of the feed back transformer is prevented. At output terminal 17 there appears an A.C. voltage at a frequency determined by the impedance values of the oscillator. Terminal 17 is connected via a capacitor 18 to a Schmitt trigger 20 comprised of two triodes 21 and 22; particularly, capacitor 18 is connected to the grid of triode 21. A voltage divider 19, 19' adjustably biases triode 21 and the oscillator output is superimposed upon such bias. Circuit element 19 is a potentiometer. Adjustment of its slider serves to adjust the D.C. bias superimposed upon the sinusoidal control voltage of this Schmitt trigger. Accordingly, the duration of the pulse and the time period between two adjacent pulses is adjustable therewith. Usually one will adjust the slider so that each pulse duration is similar to the time period between two pulses.

The anode of triode 21 is connected to the grid of triode 22. Both triodes are connected via a common cathode resistor 26 to ground. The anode of triode 22 is the output terminal 24 of this Schmitt trigger circuit 20 and a train of rectangularly shaped voltage pulses appears at this terminal 24.

Next in circuit there is a cathode follower amplifier 30 including a triode 31 having its grid connected to terminal 24 via a capacitor 25.

There is provided a stabilizer 40 including a glow discharge tube 41 connected between the D.C. supply lines and being bridged by a capacitor and by a potentiometer 42 the glider 43 of which is also connected to the grid of triode 31. The latter connection is not a direct one but there is a rectifier diode 44 connected across a resistor 45 with which the glider 43 is connected to the grid. This arrangement, particularly the adjusting position of glider 43 determines the top of each rectangular pulse in triode 31, which top is kept at a constant potential. Particularly, the top appears as a particular known voltage level $+U$ at the cathode of triode tube 31. Thus, circuits 30 and 40 provide for a pulse clipping action.

The rectangular voltage pulses appearing at the grid of triode 31 fed thereto via capacitor 25 would produce a larger cathode voltage drop if the pulse top were at a higher level and not clipped. Thus, at the adjusted pulse amplitude or top as determined by the circuit 40, the respective lower level of the rectangular pulse train is cut off by triode 31 completely.

Since the cathode of triode 31 is connected to ground, the voltage levels for the oscillations at the cathode of triode 31 is $+U$ and ground.

A capacitor 32 connects the cathode of triode 31 to ground and this capacitive connection avoids elimination of any higher harmonis from the pulses during the steep flanks thereof, so that the pulses remain rectangular indeed, particularly at the end of any pulse so that no sloping occurs toward the ground potential level.

Cathode follower 31 has two output terminals. One is 33 (see FIG. 1) for external use of the calibration voltage generator, governed by the normally closed switch blade 7.

The other output terminal is 34 at the end of voltage divider 35–36, and governed by the normally open switch blade 6. The other side of the voltage divider resistor 36 is connected to or pertains to the Y-amplifier 3 of the CRO (see FIG. 1).

There is a third terminal 37 also governed by blade 6 but additionally controlled by a blade 8 and connected to feed a higher voltage thereto than can be derived from resistor 36 at terminal 34.

The circuit network shown in FIG. 2 shows as far as the enabling control for this calibration generator is concerned a modification as compared to FIG. 1. FIG. 1 illustrates direct push button control of the switching contact blades 6 (or possibly 6'), 7, and 8 by control switch CC. FIG. 2 shows a single contact control switch CC governing a multiblade relay R, having blades 6, 7, 8.

From FIG. 1 it will be apparent, that in case of a normally open blade 6 as far as the calibration generator 4 is concerned, there is a connection between Y-amplifier 3 and the CRO Y-input terminal. On the other hand, the generator 4 is normally connected to terminal 33 by closed blade 7 providing a calibration voltage-frequency for external use.

To calibrate the CRO, a single control is operated by causing a change-over of the contact blades 6, 7, 8. Consequently, the Y-input voltage divider 2 becomes disconnected from the Y-amplifier 3 to which the calibration-voltage generator 4 is now connected instead (closing of contact 6 in FIG. 2). It should be noted that the measurand remains connected to the jack of the Y-input 1, however, it is ineffective and the measurand signal is no longer fed via the input divider 2 to the Y-amplifier 3, but the signal from the calibration-voltage generator 4 is by-passing the divider 2. The calibration voltage thus supplied by the generator 4 to the Y-amplifier 3 is, in the preferred embodiment, a square-wave voltage of defined amplitude and frequency while the potential of its pulse bases corresponds to zero voltage (ground) and the position of the said pulse bases can therefore be utilized to check the position of the zero line on the CRO tube screen.

To have a calibration-voltage waveform that is uniform and capable of being conveniently observed at all times, it is necessary that the sweep speed, once the single control switch CC is operated, be always the same regardless of the sweep that was previously set on the oscilloscope. This is accomplished by switching over the sweep speed and the trigger unit and letting the calibration voltage itself trigger the sweep. Therefore, operation of the single control CC causes the contact 8 to switch over the sweep generator and the trigger unit; in other words, the time base of the CRO is then determined by the frequency of the calibration generator. Hence, all CRO components controlling the sweep period may be checked during the calibration procedure irrespective of the sweep previously set by the operator. The advantage of this arrangement becomes apparent especially where frequent checks of the state of calibration are desirable. One operation of the single control CC is sufficient to reveal, by the waveform displayed on the cathode ray tube screen, whether or not calibration is necessary. In the affirmative cases (which are in the minority in normal operation), recalibration can be carried out by the controls provided on the CRO for the recalibration of the sensitivity, of the sweep speed, and of the zero line position. No further connections or disconnections are necessary; since the measurand uninterruptedly remains connected to the Y-input 1, the measuring procedure may immediately be taken up or continued by simply releasing the single control CC, thus causing the contacts 6, 7, 8 thereof to change over to their normal operation positions.

If a probe is employed in the measuring series, it is necessary to first eliminate any fault that might be introduced by the input voltage divider 2. Therefore, the probe is disconnected and the square wave voltage appearing across the output terminal 33 is directly fed to the Y-input 1 so that the divider 2 may be adjusted first. When this is done, the probe is inserted between the output terminal 33 of the generator 4 and the Y-input terminal 1 and the procedure is completed by adjusting the probe.

It will be understood that the invention is not limited to the embodiment described and that, for instance, the calibration voltage generator 4 may have a switchable frequency eliminating the necessity of switching over the time base 5. Similarly, the invention is not dependent on the fact that the generator 4 produces a square wave voltage, but any voltage suiting the purpose in the true sense of the invention; and it is not limited to single channel oscilloscopes, but rather permits simultaneous checking of all channels of a multi-channel CRO, as indicative by Y-input 1', attenuator 2', amplifier 3', and contact 6' and/or of CRO using electronic switches.

The invention is not limited to the embodiments described above but all changes and modifications thereof not constituting departures from the spirit and scope of the invention are intended to be covered by the following claims.

I claim:

1. In a cathode ray oscilloscope having a cathode ray tube, the combination comprising: an amplifier for input signals to be reproduced by the cathode ray tube; a cathode ray sweep control; an external input terminal for said signals; circuit means including a voltage divider for connecting said terminal to the input terminal of said amplifier; an A.C. calibration generator producing oscillations; first circuit means for deriving oscillations between a predetermined voltage level and ground potential at a predetermined frequency from said generator; second circuit means connecting said generator and said sweep control for deriving a frequency responsive signal from said generator; and a control switch connected for disconnecting said external terminal from said amplifier and for simultaneously connecting said first circuit means to the input terminal of said amplifier and said second circuit means to said sweep control of the cathode ray tube as sweep trigger for the representation of the calibration oscillations in the cathode ray tube.

2. In an apparatus as set forth in claim 1, there being a plurality of amplifiers connectable for calibration to said first means of said calibration generator.

3. In an apparatus as set forth in claim 1, said generator including a regeneratively controlled resonant circuit, a trigger circuit connected thereto and producing a train of rectangular pulses at a similar pulse frequency and a cathode follower connected to said trigger circuit.

4. In a cathode ray oscilloscope having a cathode ray tube, the combination comprising: an amplifier for signals to be reproduced by the cathode ray tube; a cathode ray sweep control; an external input terminal for said signals; circuit means including an amplitude attenuator for connecting said terminal to the input terminal of said amplifier; a second external terminal; an A.C. calibration generator producing oscillations; first circuit means for deriving oscillations between a predetermined voltage level and ground potential at a predetermined frequency from said generator; second circuit means connecting said generator and said sweep control for deriving a frequency responsive signal from said generator; means for connecting said second terminal to an output terminal of said generator; and a control switch for simultaneously (a) disconnecting said external signal input terminal from said amplifier, (b) disconnecting said second external terminal from said generator, (c) connecting said first circuit means to said amplifier input terminal, (d) connecting said second circuit means to said sweep control so that said voltage oscillations determine the sweep speed.

5. In a cathode ray oscilloscope having a cathode ray tube, the combination comprising: an amplifier for signals to be reproduced by the cathode ray tube; a cathode ray sweep control; an external input terminal for said signals; circuit means for connecting said external input terminal to the input terminal of said amplifier; an A.C. calibration generator producing oscillations; first circuit means for deriving oscillations between a determined voltage level and ground potential at a predetermined frequency from said generator; second circuit means connecting said generator and said sweep control for deriving a frequency responsive signal from said generator; and a control switch connected for disconnecting said external input terminal from the input terminal of said amplifier and for simultaneously connecting the input terminal of said amplifier to said first circuit means and said sweep control to said second circuit means so that said oscillations serve as calibrating input signal for the cathode ray tube for amplitude sensitivity, zero line and sweep speed thereof.

6. In a cathode ray oscilloscope having a cathode ray tube, the combination comprising: an amplifier for input signals to be reproduced by the cathode ray tube; a cathode ray sweep control; an external input terminal for said signals; a voltage divider connected to said terminal; a switching contact connecting said voltage divider to the input terminal of said amplifier; an A.C. calibration generator producing oscillations; first circuit means for deriving oscillations between a determined voltage level and ground potential at a predetermined frequency from said generator; second circuit means connecting said generator and said sweep control for deriving a frequency responsive signal from said generator; and a control switch connected for disconnecting said divider from said amplifier by opening said contact and for simultaneously connecting the input terminal of said amplifier to said first circuit means and said sweep control to said second circuit means so that said oscillations serve as calibrating input signal for the cathode ray tube for amplitude sensitivity, zero line and sweep speed thereof.

7. On a cathode ray oscilloscope having a cathode ray tube, a circuit arrangement to simultaneously calibrate amplitude scale, time scale and zero position comprising:
 (a) a Y amplifier for input signals;
 (b) a cathode ray sweep control;
 (c) an external input terminal for said signals and circuit means including a voltage divider for connecting said input terminal to said Y amplifier;
 (d) an A.C. calibration voltage generator producing oscillations;
 (e) first circuit means deriving oscillations from said generator;
 (f) second circuit means deriving a frequency responsive signal from said generator;
 (g) first switching means connecting in a first position said amplifier and said external input terminal and in a second position said amplifier and said generator;
 (h) second switching means connecting in a second position said first circuit means and said amplifier;
 (i) third switching means connecting in a second position said second circuit means and said cathode ray sweep control;
 (j) fourth switching means actuating in a second position said cathode ray sweep control always to a definite position; and
 (k) a control switch connected to said first switching means, said second switching means, said third switching means, and said fourth switching means simultaneously actuating said switching means from said first position to said second position whereby said sweep control is triggered directly by said calibration voltage generator so that the calibration voltage is always on the cathode ray tube as a continuous picture and simultaneous testing is made possible of the amplitude scale by a known amplitude, of the time scale by a known frequency and of the zero line by a known position of the calibration voltage.

8. Circuit arrangement as claimed in claim 7, characterized by said calibration voltage generator having an additional output, apart from that output used for the calibration of the said oscilloscope, connected to a jack on the front panel of the said oscilloscope so that the voltage derived from this jack may be used to adjust the input attenuator of the said oscilloscope and to adjust any probe that may be used in connection with the said oscilloscope.

9. Circuit arrangement as claimed in claim 7, characterized by said first switching means causing the calibration voltage to be simultaneously applied to a plurality of amplifier channels of an oscilloscope comprising a plurality of amplifier channels and electronic switches.

10. On a cathode ray oscilloscope having a cathode ray tube, a circuit arrangement to simultaneously calibrate amplitude scale, time scale and zero position comprising:
(a) a Y amplifier for input signals;
(b) a cathode ray sweep control having a trigger means;
(c) an external input terminal for said signals and circuit means including a voltage divider for connecting said input terminal to said Y amplifier;
(d) an A.C. calibration voltage generator producing oscillations;
(e) first switching means connecting in a first position said amplifier and said generator and in a second position said amplifier and said generator;
(f) second switching means actuating in a second position said cathode ray sweep control always to a definite position and switching over said trigger means; and
(g) a control switch connected to said first switching means and said second switching means simultaneously actuating said first switching means from said first position to said second position and said second switching means to said second position whereby said sweep control is triggered directly by said calibration voltage generator so that the calibration voltage is always on the cathode ray tube as a continuous picture and simultaneous testing is made possible of the amplitude scale by a known amplitude, of the time scale by a known frequency and of the zero line by a known position of the calibration voltage.

References Cited by the Examiner
UNITED STATES PATENTS 1,947,003   2/34   Finch et al. _____ 331—74

OTHER REFERENCES

Chance et al.: Waveforms, McGraw-Hill Book Company, Inc., New York, 1949 (Fig. 9–36, p. 354).

Rider et al.: "Encyclopedia on Cathode-Ray Oscilloscopes and Their Uses," Rider Publisher, Inc., New York, 1959, pp. 23–199, 23–200, 23–201, 23–204.

J. H. Ruiter: Modern Oscilloscopes and Their Uses, Constable and Company, Ltd., London, 1955; p. 313, Fig. 21–3; p. 317, Fig. 21–6.

Rider and Uslan: Encyclopedia on Cathode Ray Oscilloscopes and Their Uses, John F. Rider Publisher, Inc., New York, 1959 (Fig. 23–4, pp. 23–24 and 23–25).

DAVID G. REDINBAUGH, *Primary Examiner.*

ROY LAKE, ROBERT SEGAL, *Examiners.*